United States Patent
Colebrooke

(10) Patent No.: US 10,036,280 B2
(45) Date of Patent: Jul. 31, 2018

(54) TRANSFER COUPLINGS

(71) Applicants: ROLLS-ROYCE PLC, London (GB);
ROLLS-ROYCE DEUTSCHLAND LTD & CO KG, Blankenfelde-Mahlow, Dahlewitz (DE)

(72) Inventor: Jack Francis Colebrooke, Bristol (GB)

(73) Assignees: ROLLS-ROYCE plc, London (GB);
ROLLS-ROYCE DEUTSCHLAND LTD & CO KG, Dahlewitz (DE)

(*) Notice: Subject to any disclaimer, the term of this patent is extended or adjusted under 35 U.S.C. 154(b) by 113 days.

(21) Appl. No.: 15/090,970

(22) Filed: Apr. 5, 2016

(65) Prior Publication Data

US 2016/0319699 A1   Nov. 3, 2016

(30) Foreign Application Priority Data

Apr. 30, 2015   (GB) .................................. 1507390.1

(51) Int. Cl.
*F01D 25/18* (2006.01)
*F16H 57/04* (2010.01)
(Continued)

(52) U.S. Cl.
CPC ................ *F01D 25/18* (2013.01); *F02C 7/06* (2013.01); *F02C 7/36* (2013.01); *F16H 1/28* (2013.01); *F16H 57/04* (2013.01); *F16H 57/043* (2013.01); *F16H 57/0427* (2013.01); *F16H 57/0486* (2013.01); *F16L 25/10* (2013.01); *F16L 37/50* (2013.01); *F05D 2260/40* (2013.01); *F05D 2260/406* (2013.01); *F05D 2260/40311* (2013.01); *F05D 2260/98* (2013.01)

(58) Field of Classification Search
None
See application file for complete search history.

(56) References Cited

U.S. PATENT DOCUMENTS 2,988,325 A   6/1961   Dawson
2,999,000 A   9/1961   Spat
(Continued)

FOREIGN PATENT DOCUMENTS

CH   571658 A5   1/1976
CN   103291884 A   9/2013
(Continued)

OTHER PUBLICATIONS

Dec. 23, 2016 Search Report issued in European Patent Application No. 16163651.
(Continued)

*Primary Examiner* — Jacob S. Scott
*Assistant Examiner* — Timothy Hannon
(74) *Attorney, Agent, or Firm* — Oliff PLC

(57) ABSTRACT

A transfer coupling has a static component and a rotatable component arranged in axial alignment. The static component includes a first number (n−1) of radially extending ports and the rotatable component has a second number (n) of radially extending ports, the radially extending ports arranged in a common circumferential plane, wherein the ports on each component are equally spaced around the component and the number of ports on a first of the components is one less than on the second of the components.

19 Claims, 3 Drawing Sheets

(51) Int. Cl.
  *F02C 7/06*   (2006.01)
  *F16L 25/10*  (2006.01)
  *F02C 7/36*   (2006.01)
  *F16H 1/28*   (2006.01)
  *F16L 37/50*  (2006.01)

(56) References Cited

U.S. PATENT DOCUMENTS

| | | |
|---|---|---|
| 3,259,210 A | 7/1966 | Beebe et al. |
| 3,791,758 A | 2/1974 | Jenkinson |
| 3,990,812 A | 11/1976 | Radtke |
| 4,178,129 A | 12/1979 | Jenkinson |
| 4,236,869 A | 12/1980 | Laurello |
| 4,567,784 A | 2/1986 | Hambric |
| 4,756,631 A | 7/1988 | Jones |
| 5,193,915 A | 3/1993 | Leidenfrost |
| 5,529,347 A | 6/1996 | Lee |
| 5,669,844 A | 9/1997 | Homan et al. |
| 2005/0135714 A1 | 6/2005 | Rahman et al. |
| 2005/0286824 A1 | 12/2005 | Garcia |
| 2008/0108471 A1 | 5/2008 | Deutsch et al. |
| 2008/0273822 A1 | 11/2008 | Le et al. |
| 2013/0000313 A1* | 1/2013 | Udall ............... F16L 39/04 60/772 |
| 2014/0028016 A1 | 1/2014 | Knapke |
| 2016/0160993 A1 | 6/2016 | Venter |
| 2017/0074319 A1 | 3/2017 | Sydnor |

FOREIGN PATENT DOCUMENTS

| | | |
|---|---|---|
| DE | 1043718 B | 11/1958 |
| EP | 0188910 A1 | 7/1986 |
| EP | 2078888 A1 | 7/2009 |
| EP | 3029357 A1 | 6/2016 |
| EP | 3029359 A1 | 6/2016 |
| FR | 2135319 A1 | 12/1972 |
| FR | 2381179 A1 | 9/1978 |
| FR | 2543654 A1 | 10/1984 |
| FR | 2862908 A1 | 6/2005 |
| JP | S61-136059 A | 6/1986 |
| SU | 796585 A1 | 1/1981 |
| WO | 2007/058028 A1 | 5/2007 |
| WO | 2011/120771 A1 | 10/2011 |

OTHER PUBLICATIONS

Jan. 20, 2017 Search Report issued in European Patent Application No. 16163650.1.
Sep. 29, 2016 Search Report issued in European Patent Application No. 16163650.
Sep. 30, 2016 Search Report issued in European Patent Application No. 16163651.
Oct. 20, 2015 Search Report issued in British Patent Application No. 1507390.1.
Mar. 10, 2016 Search Report issued in British Patent Application No. 1516542.6.
U.S. Appl. No. 15/091,053, filed Apr. 5, 2016 in the name of Uhkötter et al.
Oct. 24, 2017 Office Action issued in U.S. Appl. No. 15/091,053.
Dec. 12, 2017 Search Report issued in European Patent Application No. 17185332.8.
Mar. 15, 2018 Ex Parte Quayle Action issued in U.S. Appl. No. 15/091,053.

* cited by examiner

TRANSFER COUPLINGS

FIELD OF THE INVENTION

The present disclosure concerns the controlled distribution of fluid through a transfer coupling between coaxially aligned static and rotating structures.

BACKGROUND OF THE INVENTION

It is common in electro-mechanical machinery for a rotating structure to be coupled to a radially internal or radially external static structure. It is often necessary to transfer fluids between the static and rotating structure. This can be achieved by providing openings in the rotating and static part of the coupling, when the openings are in alignment, fluid can be transferred across the coupling. A problem arising with this arrangement is the interruption of flow which occurs when the openings are out of alignment and the extreme variation in flow area as the openings come in and out of alignment.

One solution which has been adopted is the use of baffles within or around the couplings to buffer the flow. Whilst this solution can be effective, the additional complexity and weight of the solution renders it unattractive or impractical in some applications.

STATEMENT OF THE INVENTION

According to a first aspect there is provided a transfer coupling comprising a static component and a rotatable component arranged concentrically, the static component including a first number of radially extending ports and the rotatable component comprising a second number of radially extending ports the radially extending ports arranged in a common circumferential plane wherein; the ports on each component are equally spaced around the component, and the number of ports on a first of the components is one less than on the second of the components.

In the present application and claims, the term "equally spaced" is to be interpreted broadly. It is to be understood that the benefits of the invention can still be achieved if the separation between ports is not precisely consistent. The determining factor will be that the spacing between ports is not so inconsistent as to result in a measurable and detrimental occurrence of back pressure pulses in the flow during each cycle of the coupling.

In some embodiments, the first of the components is the static component and the static component sits radially outboard of the rotatable component.

The ports on a component may be of consistent shape and size. The ports on each component may share the same geometry. For example (but without limitation), the ports may be presented as axially extending slots or round holes. In some embodiments, the packing factor of ports on the first of the components is at least 40%. In more particular embodiments, the packing factor on the first of the components is 50% or greater.

The packing factor is the sum of the port diameters, or chord widths for non-circular holes, divided by the circumference of the component.

If 'n' is the number of ports in the component, then . . .

$$\text{packing factor} = \frac{n\phi_{radial\ hole}}{\pi\phi_{component}}$$

So as an example (without limitation), a component of circumference of 200 mm, with 10×10 mm diameter ports would have a packing factor of 50%. Or, the distance between the ports is the same as the diameter of the ports.

In some embodiments, the ports are arranged at an incline to the radius, this can reduce pressure drop through the coupling.

The coupling of the invention is applicable to any rotating fluid coupling requirement. Examples (without limitation) of such couplings include; oil transfer couplings, gas transfer couplings and rotary shaft unions. One particular application is in a gear box, a more specific application is in a planetary epicyclic gear box.

Through mathematical modelling, the inventors have identified parameters in the design of a transfer coupling which maximise the total open area of the coupling over a complete rotation.

Significant parameters were identified as; spacing of the ports on the components, packing factor of the ports, the relative number of ports on each component of the coupling.

Unequal spacing of ports will result in variations in the open area through the coupling as the components relatively rotate. These cyclic variations can result in back pressure pulses at points in the cycle when the area contracts. By spacing the ports substantially equally, a much smoother flow through the coupling can be achieved.

As with the spacing of the ports, there is a mathematical prediction for optimum flow. Predictions recommend a packing factor of 50% or greater, however, the determining factor will be that the density is not so small as to result in a measurable and detrimental occurrence of back pressure pulses in the flow during each cycle of the coupling.

A lower packing factor on one of the components requires an increased packing factor on the other component if the through flow requirements are to be met. If the packing factors between the couplings are too diverse, then the result can be similar to that for significantly unequal spacing. The increased difference in port numbers increases the back pressure pulses from the device.

The inventors' mathematical modelling predicts a maximum in open area occurs when the difference in the number of ports on the two coupling components is one, as there is minimum distance to be travelled by the rotary part between ports coming into alignment.

It will be understood that the total number of ports is related to (among other parameters) the packing factor. The larger the coupling, the greater the number of ports (assuming the port dimensions remain substantially the same). The dimensions of the ports relative to the coupling components will also affect the packing factor. It is immaterial which of the components carries an odd number of ports and which carries an even number of ports.

The coupling can be arranged for transfer of fluids from a radially outward space to a radially inward space, or from a radially inward space to a radially outward space. For example (but without limitation) the coupling may be arranged for transferring lubricant from a reservoir in a static structure to moving parts in a rotating structure.

As mentioned above, couplings of the invention can be used to assist in delivery of a smooth flow of oil to a planetary gear box. In one aspect, the invention provides a gas turbine engine having a planetary gear box wherein the planet carrier of the planetary gear box is coupled to a radially outboard static housing by a coupling in accordance with the invention. One or both of the components of the coupling of the invention may be integrally formed with structures being coupled.

BRIEF DESCRIPTION OF THE DRAWINGS

Embodiments of the invention will now be described by way of example with reference to the accompanying Figures in which.

DETAILED DESCRIPTION OF DRAWINGS AND EMBODIMENTS

Figure 1:
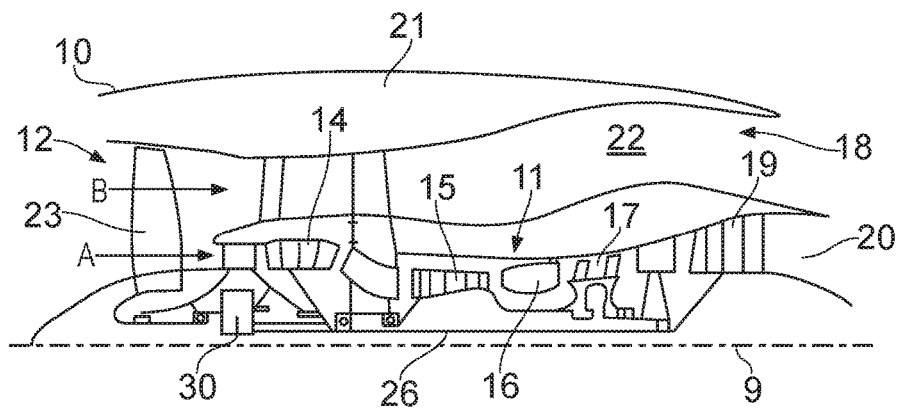
FIG. 1 is a sectional side view of a gas turbine engine having a geared fan.

Referring to FIG. 1, a two-shaft gas turbine engine 10 has a principal rotational axis 9. The engine 10 comprises an air intake 12 and a propulsive fan 23 that generates two airflows A and B. The gas turbine engine 10 comprises a core engine 11 having, in axial flow A, a low pressure booster compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines, in axial flow B, a bypass duct 22 and a bypass exhaust nozzle 18. The fan 23 is attached to and driven by the low pressure turbine 19 via shaft 26 and epicyclic gearbox 30.

The gas turbine engine 10 works in a conventional manner so that air in the core airflow A is accelerated and compressed by the high pressure booster compressor 14 and directed into the high pressure compressor 15 where further compression takes place. The compressed air exhausted from the high pressure compressor 15 is directed into the combustion equipment 16 where it is mixed with fuel and the mixture combusted. The resultant hot combustion products then expand through, and thereby drive the high pressure and low pressure turbines 17, 19 before being exhausted through the nozzle 20 to provide some propulsive thrust. The high pressure turbine 17 drives the high pressure compressor 15 by a suitable interconnecting shaft. The fan 23 normally provides the majority of the propulsive thrust.

A known mechanical arrangement for a two-shaft geared fan gas turbine engine 10 is shown in FIG. 1. The low pressure turbine 19 drives the shaft 26, which is coupled to a sun wheel, or sun gear, 28 of the epicyclic gear arrangement 30. Radially outwardly of the sun gear 28 and intermeshing therewith, in conventional manner, is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis independently. The planet carrier 34 is coupled via linkages 36 to the fan 23 in order to drive its rotation about the engine axis 9. Radially outwardly of the planet gears 32 and intermeshing therewith is an annulus or ring gear 38 that is coupled to stationary structure 24. As can be seen, the transfer coupling of the invention 40 sits on the shaft 26. The rotatable component 41 (see FIG. 3) rotates with shaft 26, the static component 42 of the coupling is mounted to a stationary structure 24 in a fixed position radially outboard of the rotatable component 41.

Figure 2:
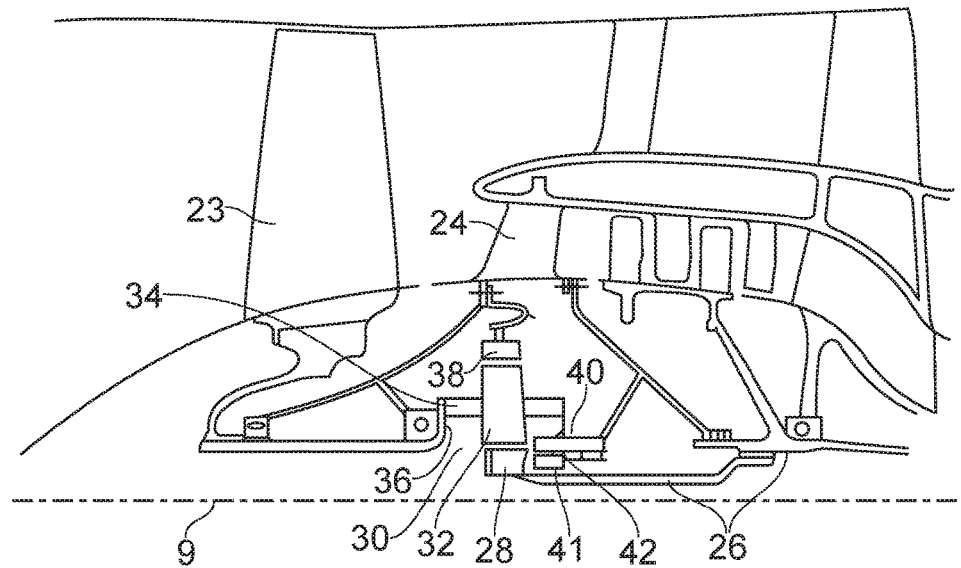
FIG. 2 is an enlargement of a planetary arrangement epicyclic gearbox used in the gas turbine engine of FIG. 1 and coupled to a static housing by means of a transfer coupling in accordance with the present invention.
Figure 3:
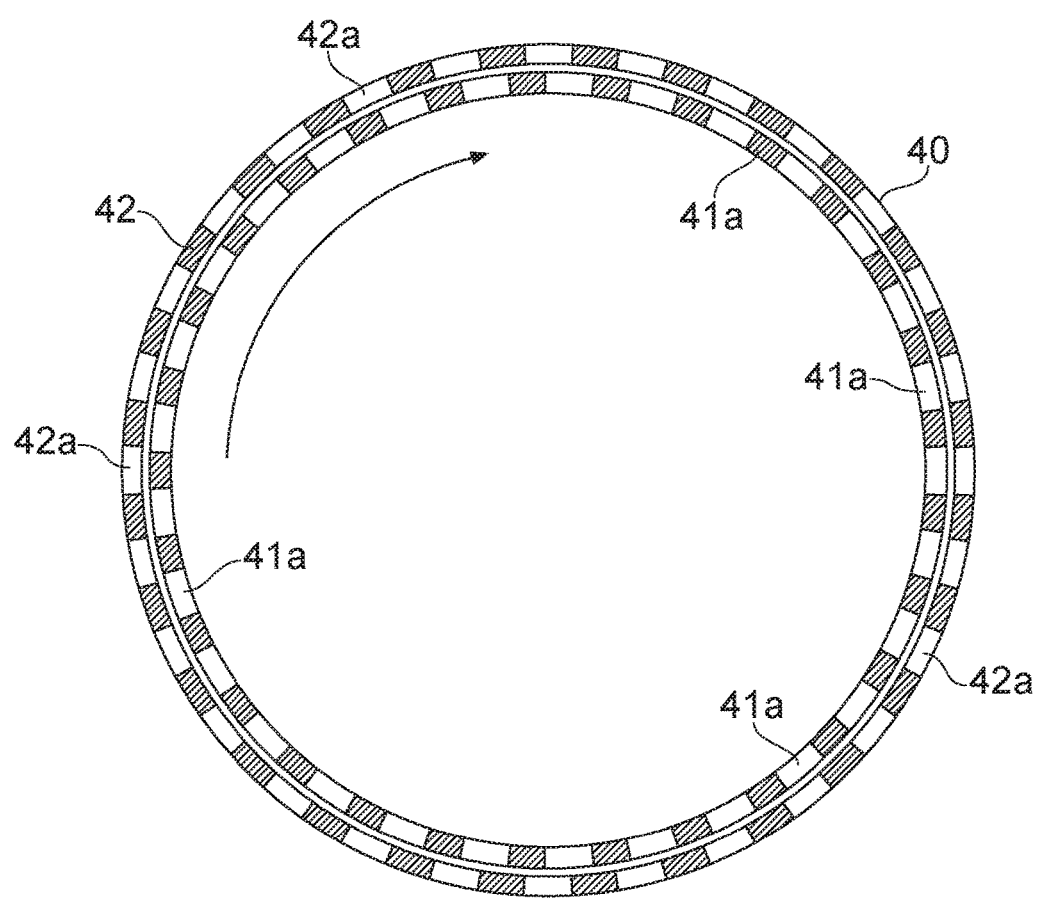
FIG. 3 is a section through a coupling in accordance with the present invention.

FIG. 3 shows a section through a transfer coupling 40 in accordance with the invention. In particular, the figure shows the arrangement of ports 41a, 42a in each of the components. The coupling comprises an outer ring 42 which, in use, is secured in a fixed rotational position to a stationary structure (for example structure 24 of FIG. 2). Radially inwardly and in close radial contact with the stationary component 42 is a rotatable component 41 which, in use, is secured to a rotating structure (such as sun gear 28) such that the rotatable component rotates relative to the stationary component 42, with the rotating structure.

As can be seen, the ports 41a, 42a in each of the components of the coupling are substantially equally spaced about the annulus. The outer, stationary component 42 has twenty-eight substantially identical ports 42a. The circumferential dimensions of the ports along the circumference of the coupling are very similar to that of the gaps between them creating a circumferential packing factor of about 50%.

The inner, rotatable component 41 has twenty-nine substantially identical ports 41a. Again, the dimensions of the ports along the circumference of the coupling are very similar to that of the gaps between them creating a circumferential packing factor of about 50%.

In use, the inner rotatable component 41 rotates relative to the stationary component 42 in the direction shown by the arrow (though this is not essential). As can be seen, at the illustrated rotational position, there is a significant majority of ports 41a of the rotatable component in fluid communication with ports 41b. Since the arrangement of the ports on each component is rotationally symmetrical, this will be the state of the coupling at any rotational position of the rotatable component, only angularly shifted.

Figure 4:
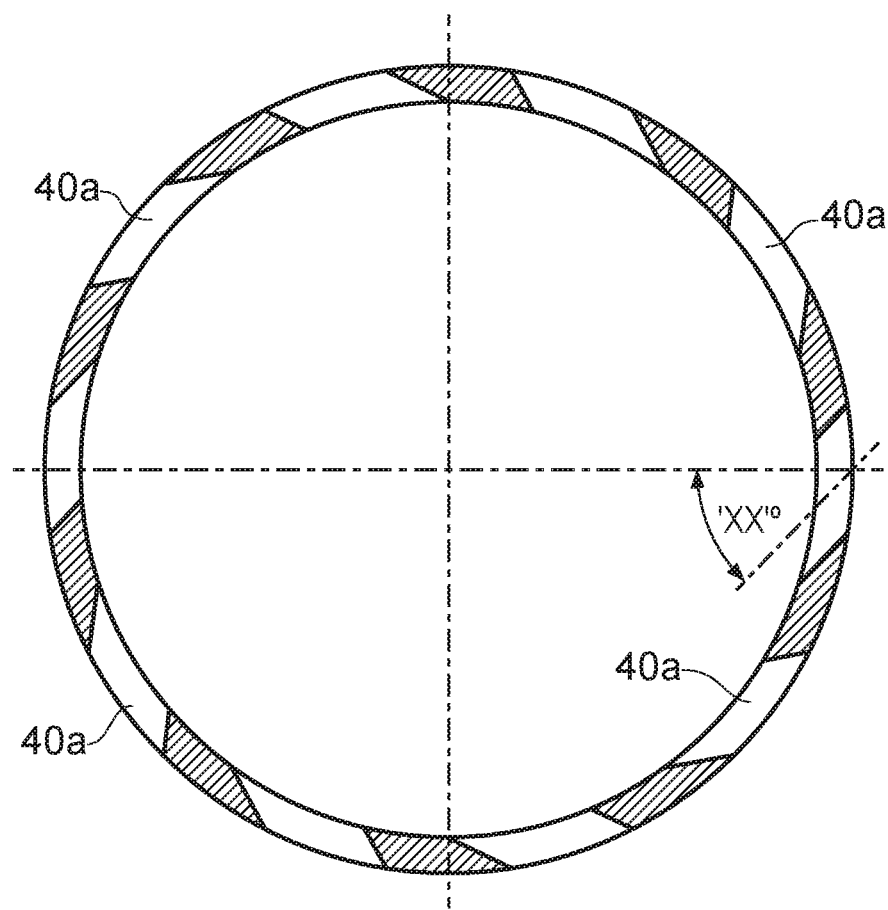
FIG. 4 is a section through a component of another embodiment of a coupling in accordance with the present invention.

FIG. 4 shows a component of a coupling in accordance with the invention. The arrangement of ports 40a shown may be applied to either or both of the structural and rotatable components of a coupling of the invention.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:
1. A transfer coupling comprising;
a static component and
a rotatable component arranged concentrically with the static component,
the static component including a first number of radially extending ports,
the radially extending ports arranged in a common circumferential plane wherein;
the ports on each component are equally spaced around the component,
the number of ports on a first of the components is one less than the number of ports on the second of the components, and
the packing factor of ports on each of the components is at least 40%.

2. The transfer coupling as claimed in claim 1, wherein the packing factor on the first of the components is 50% or greater.

3. The transfer coupling as claimed in claim 1, wherein the first of the components is the static component and the static component sits radially outboard of the rotatable component.

4. The transfer coupling as claimed in claim 1, wherein the ports on each component are of consistent shape and size.

5. The transfer coupling as claimed in claim 1, wherein the ports on each component share the same geometry.

6. The transfer coupling as claimed in claim 5, wherein the shared geometry is axially extending slots.

7. The transfer coupling as claimed in claim 5, wherein the shared geometry is round holes.

8. The transfer coupling as claimed in claim 1, wherein the ports on one or both components are arranged at an incline to a radius of the component.

9. A planetary gear box, wherein a rotating shaft of the planetary gear box is coupled to a radially outboard static housing of the planetary gear box by the transfer coupling of the planetary gearbox in accordance with claim 1.

10. A gas turbine engine having the planetary gear box of the form recited in claim 9.

11. A transfer coupling comprising;
a static component and
a rotatable component arranged concentrically with the static component,
the static component including a first number of radially extending ports,
the rotatable component comprising a second number of radially extending ports,
the radially extending ports arranged in a common circumferential plane wherein;
the ports on each component are equally spaced around the component,
the number of ports on a first of the components is one less than the number of ports on the second of the components, and
the packing factor on the first of the components is 50% or greater, wherein
the ports on each component share the same geometry.

12. The transfer coupling as claimed in claim 11, wherein the first of the components is the static component and the static component sits radially outboard of the rotatable component.

13. The transfer coupling as claimed in claim 11, wherein the shared geometry is axially extending slots.

14. The transfer coupling as claimed in claim 11, wherein the shared geometry is round holes.

15. A transfer coupling comprising;
a static component and
a rotatable component arranged concentrically with the static component,
the static component including a first number of radially extending ports,
the rotatable component comprising a second number of radially extending ports,
the radially extending ports arranged in a common circumferential plane wherein;
the ports on each component are equally spaced around the component,
the number of ports on a first of the components is one less than the number of ports on the second of the components, and
a majority of the first number of radially extending ports circumferentially overlaps with the second number of radially extending regardless of an orientation of the rotatable component relative to the static component.

16. The transfer coupling as claimed in claim 15, wherein the first of the components is the static component and the static component sits radially outboard of the rotatable component.

17. The transfer coupling as claimed in claim 15, wherein the ports on each component share the same geometry.

18. The transfer coupling as claimed in claim 17, wherein the shared geometry is axially extending slots.

19. The transfer coupling as claimed in claim 17, wherein the shared geometry is round holes.

* * * * *